(12) United States Patent
Karakoussis et al.

(10) Patent No.: US 12,330,333 B2
(45) Date of Patent: Jun. 17, 2025

(54) METHOD FOR PRODUCING A CEMENTITIOUS BOARD, APPARATUS FOR PRODUCING A CEMENTITIOUS BOARD, AND CEMENTITIOUS BOARD

(71) Applicant: Knauf Gips KG, Iphofen (DE)

(72) Inventors: Stergios Karakoussis, Laubach (DE); Alexander Hartmann, Kleinlangheim (DE); Georgi Paraskov, Neustadt an der Aisch (DE); Carlo Knauf, Weigenheim (DE); Anton Peter, Wuerzburg (DE)

(73) Assignee: Knauf Gips KG, Iphofen (DE)

( * ) Notice: Subject to any disclaimer, the term of this patent is extended or adjusted under 35 U.S.C. 154(b) by 0 days.

(21) Appl. No.: 18/493,502

(22) Filed: Oct. 24, 2023

(65) Prior Publication Data

US 2024/0066754 A1 Feb. 29, 2024

Related U.S. Application Data

(62) Division of application No. 17/781,760, filed as application No. PCT/EP2019/000337 on Dec. 16, 2019, now Pat. No. 11,911,928.

(51) Int. Cl.
*B32B 37/12* (2006.01)
*B28B 19/00* (2006.01)
(Continued)

(52) U.S. Cl.
CPC ............ *B28B 19/0092* (2013.01); *B32B 3/10* (2013.01); *B32B 5/18* (2013.01); *B32B 7/12* (2013.01); *B32B 37/0046* (2013.01); *B32B 37/02* (2013.01); *C04B 41/009* (2013.01); *C04B 41/4503* (2013.01); *C04B 41/4869* (2013.01); *C04B 41/63* (2013.01); *E04C 2/044* (2013.01); *B32B 5/02* (2013.01); *B32B 5/245* (2013.01); *B32B 13/08* (2013.01); *B32B 13/14* (2013.01); *B32B 29/007* (2013.01); *B32B 37/12* (2013.01); *B32B 2250/40* (2013.01); *B32B 2255/02* (2013.01); *B32B 2255/26* (2013.01); *B32B 2266/0214* (2013.01); *B32B 2266/14* (2016.11); *B32B 2307/724* (2013.01); *C04B 2111/0062* (2013.01)

(58) Field of Classification Search
None
See application file for complete search history.

(56) References Cited

U.S. PATENT DOCUMENTS

| 3,964,944 A | 6/1976 | Gwynne |
|---|---|---|
| 2003/0091811 A1 | 5/2003 | Skrzyniarz |

(Continued)

*Primary Examiner* — Alexander S Thomas
(74) *Attorney, Agent, or Firm* — Mark Terry

(57) ABSTRACT

An apparatus for producing a cementitious board includes a conveying device for conveying a first liner with first overlap sections-in a transport direction, at least one slurry feeder device for applying at least one layer of at least one slurry comprising a cementitious material onto the first liner, a liner feeding device for providing and arranging a second liner with second overlap sections such that it contacts the first overlap sections of the first liner wherein the at least one layer of the at least one slurry is arranged between the first liner and the second liner, an adhesive foam feeder for providing an adhesive foam on at least one of the first or the second overlap sections, and a means for bonding the first liner and the second liner.

5 Claims, 2 Drawing Sheets

(51) Int. Cl.
  *B32B 3/10* (2006.01)
  *B32B 5/18* (2006.01)
  *B32B 7/12* (2006.01)
  *B32B 37/00* (2006.01)
  *B32B 37/02* (2006.01)
  *C04B 41/00* (2006.01)
  *C04B 41/45* (2006.01)
  *C04B 41/48* (2006.01)
  *C04B 41/63* (2006.01)
  *E04C 2/04* (2006.01)
  *B32B 5/02* (2006.01)
  *B32B 5/24* (2006.01)
  *B32B 13/08* (2006.01)
  *B32B 13/14* (2006.01)
  *B32B 29/00* (2006.01)
  *C04B 111/00* (2006.01)

(56) References Cited

U.S. PATENT DOCUMENTS

| | | |
|---|---|---|
| 2004/0266303 A1 | 12/2004 | Jaffee |
| 2006/0162839 A1 | 7/2006 | Seki |
| 2016/0123895 A1 | 5/2016 | Yamazaki |
| 2018/0345534 A1 | 12/2018 | Bland |

METHOD FOR PRODUCING A CEMENTITIOUS BOARD, APPARATUS FOR PRODUCING A CEMENTITIOUS BOARD, AND CEMENTITIOUS BOARD

CROSS-REFERENCE TO RELATED APPLICATIONS

This patent application is a divisional application of patent application Ser. No. 17/781,760 filed Jun. 2, 2022, and titled "method for producing a cementitious board, apparatus for producing a cementitious board, and cementitious board", which is now U.S. Pat. No. 11,911,928, and which claims priority to international patent application number PCT/EP2019/000337 filed Dec. 16, 2019 and titled "method for producing a cementitious board, apparatus for producing a cementitious board, and cementitious board". The subject matter of patent application Ser. Nos. 17/781,760 and PCT/EP2019/000337 is hereby incorporated by reference in its entirety.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

The present invention relates to a method for producing a cementitious board, apparatus for producing a cementitious board, and cementitious board according to the respective independent claim. The technical field relates to the production of cementitious boards, e.g. the production of gypsum building boards.

BACKGROUND

In a conventional method, the slurry comprising a cementitious material, water and additives is spread between two liners, e.g. layers of cardboard or fiber mat liners, and shaped by means of a forming bar into the appropriate shape and thickness. Typically, the paperboard liners have a density between 100 g/m2 and 200 g/m2. Preferably, the liners may comprise cellulose. In the production line typically the lower liner constitutes the visible side of the finished cementitious boards, whereas the upper liner constitutes the back side of the finished cementitious boards. First, slurry is applied to and distributed on the lower liner.

A polymer PVAC (polyvinyl acetate) adhesive is used to bond the lower liner to the upper liner. Preferably, this adhesive is distributed on the upper liner in such a way that a lane of the adhesive is arranged only at the overlap sections. After the two liners have been arranged on top of one another so as to be in contact at predetermined overlap sections and passed the forming station, the liners bond typically after 5 to 30 seconds.

In the state of the art, the adhesive is dispensed as a thin trace to the liner via a dosing hose and afterwards spread over the corresponding width with spreading means. With this conventional method, the adhesive consumption is about 2 to 5 grams per linear meter per side. It is a constant concern to improve the adhesion of the liners as well as to reduce the amount of adhesive used.

The following problems may occur: If the adhesive is reduced with the conventional application method, it will easily be spread irregularly over the overlap sections, resulting in areas without adhesive which appear as if air inclusions were present or incorrect adhesion. Furthermore, the adhesive effect is reduced with reduced amounts of adhesive. This can result in the detrimental effect that the edges of the plasterboard or cementitious board can no longer be formed in sufficient qualities. In the state of the art, the liners, especially cardboard liners, often do not adhere properly to the cementitious core in the overlap sections. During the drying process, a relatively large amount of adhesive in addition to two layers of liner in the overlap sections decrease the vapor diffusion rate through the liners. This results in a reduced adhesion of the liner in the overlap section, which ultimately leads to a deficient product.

SUMMARY

To overcome or at least reduce the problems known in the prior art, the invention provides a method for producing a cementitious board, an apparatus for producing a cementitious board, and a cementitious board according to the respective independent claim. Advantageous aspects are the subject matter of the independent claims.

The invention comprises a method for producing a cementitious board, wherein a first liner with first overlap sections is provided and furnished with at least one layer of at least one slurry comprising a cementitious material; a second liner with second overlap sections is provided and arranged such that it contacts the first overlap sections of the first liner, wherein the at least one layer of the at least one slurry is arranged between the first liner and the second liner; an adhesive foam is provided at least partly on at least one of the first or second overlap sections; and the first liner and the second liner are bonded via the adhesive foam in the overlap sections.

The use of adhesive foam allows reducing the overall amount of adhesive while the cementitious board can be formed in sufficient qualities, i.e. in regard to imperfections with air inclusions or incorrect adhesion. The cementitious material can set chemically, such as for example cement or stucco. Preferably, the cementitious material is a calcium sulfate material. The cementitious board comprises at least 50% w/w cementitious material. In particular, the cementitious board can be a plasterboard or a cement board. The vapor diffusion rate in the overlap section is at least 10% higher compared to the same cementitious board, the liners of which are bonded by the same but non-foamed adhesive.

BRIEF DESCRIPTION OF THE DRAWINGS

In the following, the invention is explained in more detail with reference to figures, wherein.

DETAILED DESCRIPTION

Figure 1:
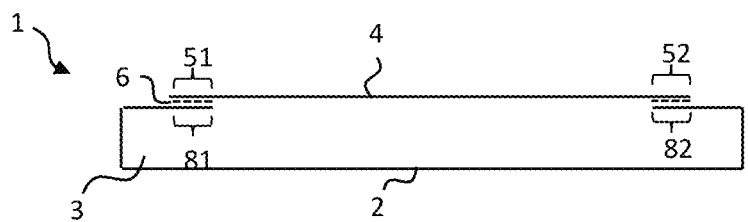
FIG. 1 shows a cross section of a first exemplary embodiment of a cementitious board.

In a preferred aspect the adhesive foam is provided in the overlap sections in a width corresponding to more than 50% of the width of this overlap sections. The adhesive foam may be provided as a single strip of a width corresponding to more than 50% of the width of the overlap sections. Alternatively, the adhesive foam may be provided in the form of a plurality of strips each of smaller width than 50% of the width of the overlap sections, the sum of these widths corresponding to more than 50% of the width of the overlap sections.

According to another preferred aspect the adhesive foam is provided on two separate overlap sections. The two separate overlap sections can be arranged on two opposite edge sections of the first liner and/or the second liner.

According to an advantageous aspect the method further comprises a step of generating the adhesive foam by reducing the density of an adhesive by a factor of 2 to 15, preferably by factor of 5 to 10 by foaming it. The adhesive foam can be created by physical or chemical means in an adhesive foaming station. Preferably, the adhesive foam is produced by mechanical foaming where a gas is added/incorporated by stirring. Preferably, the gas supply is adjustable. The gas used can be ambient air, nitrogen, noble gases, carbon dioxide, hydrocarbons or combinations thereof. Preferably, the gas supply comprises ambient air. Furthermore, the degree of foaming can be controlled by regulating the gas supply or the stirring intensity.

According to another advantageous development the step of generating the adhesive foam is carried out at a temperature below 35° C., preferably below 30° C. At higher temperatures adhesive particles can agglomerate and hinder the proper function of the foam generator.

Preferably the adhesive foam is provided in a density in the range of 50 g/l to 800 g/l. It is especially preferred when the adhesive foam is provided in a density in the range of 70 g/l to 600 g/l, even more preferably in the range of 70 g/l to 400 g/l, and most preferably in the range of 70 g/l to 150 g/l.

Furthermore, it is preferred when the adhesive foam is provided in the overlap sections in an amount of 5 g/m overlap section or less, in particular in an amount of 2 g/m overlap section or less.

According to a particularly advantageous aspect the adhesive foam is provided in the overlap sections as discrete elements, preferably in the form of for example spots, stripes, in a zigzag pattern, a grid pattern or in a cross-shaped pattern. Preferably, the discrete elements do not cover the entire surface of the overlap sections.

According to another advantageous aspect the adhesive foam is provided in the overlap sections in a width of 20 mm to 30 mm.

It is preferred when the method further comprises the step of distributing the adhesive foam in the overlap section. The adhesive foam can be distributed evenly or unevenly in the overlap section.

According to another advantageous technical aspect the step of distributing the adhesive foam is carried out by means of a roller.

Another aspect of the invention relates to an apparatus for producing a cementitious board, comprising: a conveying device for conveying a first liner with first overlap sections in a transport direction; at least one slurry feeder device for applying at least one layer of at least one slurry comprising a cementitious material onto the first liner; a liner feeding device for providing and arranging a second liner with second overlap sections such that it contacts the first overlap sections of the first liner wherein the at least one layer of the at least one slurry is arranged between the first liner and the second liner; and an adhesive foam feeder for providing an adhesive foam on at least one of the first or the second overlap sections; and a means for bonding the first liner and the second liner.

By providing such an apparatus, the invention allows to reduce the overall amount of adhesive while the cementitious board can be formed in good quality with regard to imperfections related to air inclusions or insufficient adhesion of the liner to the cementitious core.

The adhesive foam feeder may also comprise an adhesive foaming station capable of generating a foam of an adhesive, preferably a polymer adhesive, more preferably a polymer adhesive comprising vinyl acetate (e.g. PVAC=(homo)polymer of vinyl acetate or EVAC=copolymer of ethylene and vinyl acetate). The adhesive foaming station can comprise a cooling unit to regulate the temperature of the foam, preferably to a temperature below 35° C., more preferably to a temperature below 30° C. In general, air drying or setting adhesives can also be used.

It is preferred when the adhesive foaming station is capable of reducing the density of the adhesive by a factor of 2 to 15, preferably by a factor 5 to 10, for generating the adhesive foam. This equals a reduction of the adhesive density by 50% to 97%, preferably by 80% to 90%. For example, the adhesive foaming station can comprise an adjustable gas supply. The gas used can be ambient air, nitrogen, noble gases, carbon dioxide, hydrocarbons or combinations thereof. Preferably, ambient air is used. Furthermore, the degree of foaming can be controlled in the adhesive foaming station by regulating the gas supply or the stirring intensity.

In another preferred development, the adhesive foam feeder comprises a roller for the distribution of the applied adhesive foam. Another aspect of the invention concerns a cementitious board comprising a core made of a cementitious material and having a planar first face and a planar second face, comprising a liner on the first face and a liner on the second face, the liners being bonded by an adhesive foam in an overlap section, wherein the vapor diffusion rate in the overlap section is at least 10% higher compared to the same cementitious board, the liners of which are bonded by the same but non-foamed adhesive. Preferably, the liners comprise a cellulose material, more preferably a paper material.

Figure 2:
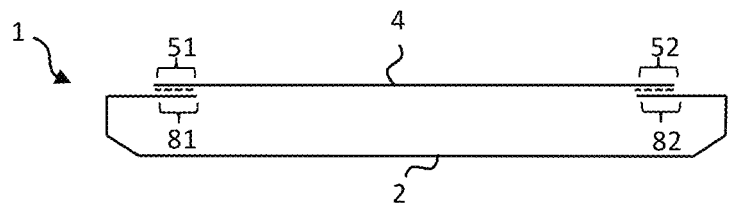
FIG. 2 shows a cross section of a second exemplary embodiment of a cementitious board.

FIG. 1 and FIG. 2 show side views of a first and a second exemplary embodiment of a cementitious board 1 both of which have differently formed edge sections for specific needs.

In the present example, the cementitious board 1 is a gypsum plasterboard with a first paper liner 2 having first overlap sections 81, 82. A second paper liner 4 having second overlap sections 51, 52 is arranged such that it contacts the first overlap sections 81, 82 of the first liner 2.

One layer of slurry comprising a cementitious, in this case a calcium sulfate material 3 is arranged between the first liner 2 and the second liner 4. The separate overlap sections 51, 52, 81, 82 are arranged on two opposite edge sections of the first liner 2 and the second liner 4, respectively.

The first liner 2 and the second liner 4 are bonded by an adhesive foam 6 in the overlap section 51, 52, 81, 82. The use of a foamed adhesive reduces the overall amount of adhesive while the cementitious board can be formed in a good quality with regard to unwanted air inclusions or insufficient adhesion of the liner to the core. Since the foamed adhesive does not seal the complete surface on which it is applied, the (water) vapor diffusion rate is enhanced compared to an adhesive application over the entire surfaces of the overlap sections. This is especially advantageous since during the drying of the cementitious board excess water in form of water vapor has to exit the board through the liner material.

Figure 3:
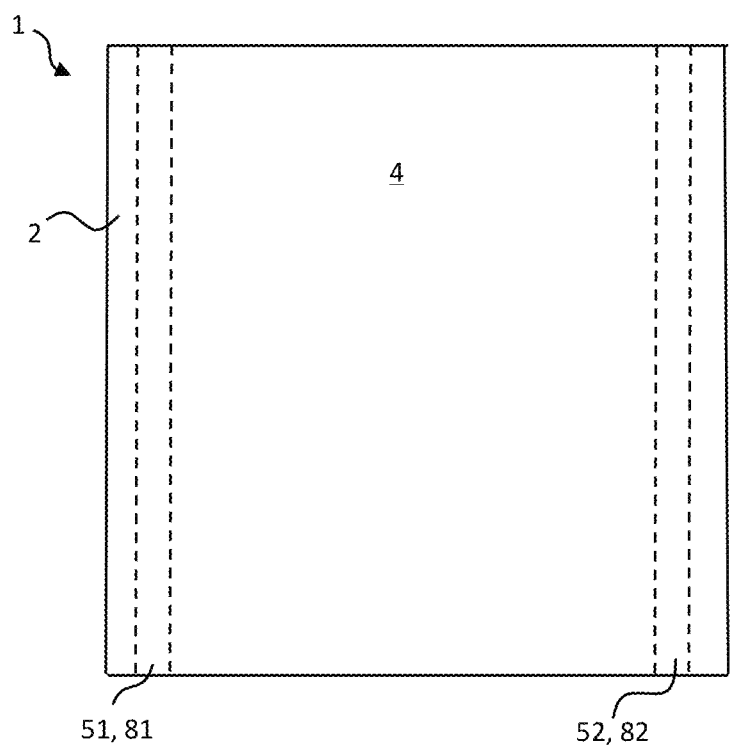
FIG. 3 shows a top view of a cementitious board.

FIG. 3 shows a top view of the cementitious board 1 of FIG. 1 or FIG. 2.

The first liner 2 and the second liner 4 are bonded by an adhesive foam (see reference numeral 6 in FIG. 1) in the overlap section 51, 52, 81, 82, which are arranged along opposite edges of the cementitious board 1.

During the production of the illustrated example of the cementitious board 1, the adhesive foam is provided on two parallel separate overlap sections 51, 52, 81, 82 in a width, which corresponds to more than 50% (e.g. 70% to 100%) of the width of the overlap sections.

The adhesive foam has a density of 50 g/l to 800 g/l. It is particularly preferred when the adhesive foam has a density of 70 g/l to 600 g/l, even more preferably of 70 g/l to 400 g/l, and most preferably of 70 g/l to 150 g/l.

The adhesive foam is provided at the overlap sections 51, 52, 81, 82 in an amount of 2 g/m per running meter of each individual overlap section or less and in a width, which corresponds to more than 50% of the width of this overlap sections 51, 52, 81, 82.

According to this example the adhesive foam is provided in the form of a plurality of strips each of a width smaller than 50% of the width of the overlap section 51, 52, 81, 82, the sum of these widths corresponding to more than 50% of the width of the overlap sections 51, 52, 81, 82.

In the shown example, the adhesive foam is provided during the production at the overlap sections 51, 52, 81, 82 in a width of 20 mm to 30 mm.

Figure 4:
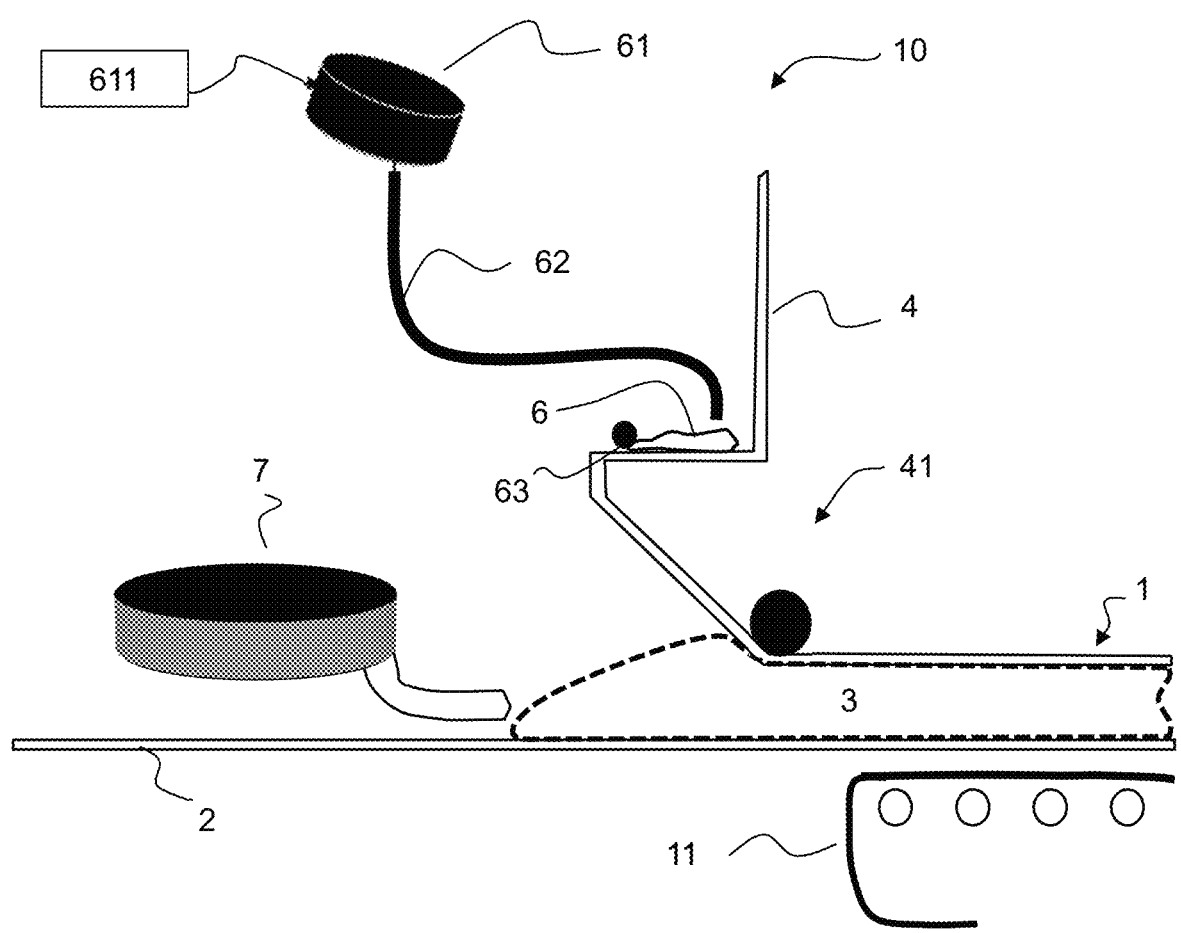
FIG. 4 shows a schematic illustration of an apparatus for producing a cementitious board.

FIG. 4 shows a schematic diagram of an apparatus 10 for producing the cementitious board 1 as shown for example in FIG. 1, FIG. 2 and FIG. 3.

The apparatus 10 comprises a conveying device 11 capable of conveying a first liner 2 with first overlap sections (e.g. see 81, 82 in FIG. 1) along a transport direction.

A slurry with a cementitious material 3 is disposed/deposited onto the first liner 2 via a slurry feeder device 7 (in this example comprising a mixer and a hose) capable of mixing the slurry and applying the layer of slurry comprising the cementitious material 3 onto the first liner.

The apparatus 10 has a liner feeding device 41 capable of providing the second liner 4 on top of the at least one slurry layer. The second liner 4 is arranged such that the second overlap sections (e.g. see 51, 52 in FIG. 1) come into contact with the first overlap sections 81, 82 of the first liner 2. During the production process of the cementitious board 1, the slurry 3 is arranged between the first liner 2 and the second liner 4. According to another embodiment of the invention, several layers of slurry can be applied between the liners, for example 2 or 3 or more slurry layers.

The apparatus 10 is capable of producing a cementitious board 1 by use of an adhesive foam 6 to achieve the above mentioned advantages.

The apparatus has an adhesive foam feeder comprising foam generating means 61 capable of applying shear forces to the un-foamed adhesive (for example a foam generator capable of max. 2150 revolutions per min) and thereby foam the adhesive. The foam feeder further comprises a foam transport tube 62 for providing the adhesive foam 6 onto the first or the second overlap sections of the second liner 4.

The un-foamed adhesive is delivered to the foam generating means 61 from a container 611. In the shown example, the density of the adhesive 6 is by a factor of 2 to 15, preferably by a factor of 5 to 10, lower than the density of the adhesive in container 611. The foam generating means 61 might comprise a heating or cooling means to provide a temperature below 35° C., preferably below 30° C., during the step of generating the adhesive foam 6.

The apparatus 10 further comprises a roller 63 for distributing the adhesive foam 6. Preferably, the adhesive foam 6 is provided in the overlap sections as discrete elements, preferably in the form of spots, stripes, in a zigzag pattern, a grid pattern or a cross-shaped pattern.

The cementitious board 1 produced by use of the apparatus 10 has a cementitious core with a planar first face and a planar second face, comprising a paper liner on the first face and a paper liner on the second face.

The overlap sections of the paper liners bonded by an adhesive foam have a vapor diffusion rate that is at least 10% higher than the vapor diffusion rate of the same cementitious board, the liners of which are bonded by the same but non-foamed adhesive.

What is claimed is:

1. An apparatus for producing a cementitious board, comprising:
    a conveying device for conveying a first liner with first overlap sections—in a transport direction;
    at least one slurry feeder device for applying at least one layer of at least one slurry comprising a cementitious material onto the first liner;
    a liner feeding device for providing and arranging a second liner with second overlap sections such that it contacts the first overlap sections of the first liner wherein the at least one layer of the at least one slurry is arranged between the first liner and the second liner;
    an adhesive foam feeder for providing an adhesive foam on at least one of the first or the second overlap sections; and
    a means for bonding the first liner and the second liner.

2. An apparatus according to claim 1, wherein the adhesive foam feeder comprises an adhesive foaming station capable of generating a foam of an adhesive.

3. An apparatus according to claim 2, wherein the adhesive foaming station is capable of reducing the density of the adhesive by a factor of 2 to 15, generating a foam of an adhesive.

4. An apparatus according to claim 1, wherein the adhesive foam feeder comprises a roller for the distribution of the applied adhesive foam.

5. A cementitious board comprising a core made of a cementitious material and having a planar first face and a planar second face, comprising a liner on the first face and a liner on the second face, the liners being bonded by an adhesive foam in an overlap section, wherein the vapor diffusion rate in the overlap section is at least 10% higher compared to the same cementitious board, the liners of which are bonded by the same but non-foamed adhesive.

* * * * *